(12) United States Patent
Singer

(10) Patent No.: US 7,013,677 B2
(45) Date of Patent: Mar. 21, 2006

(54) DEVICE FOR GLASS MELT DELIVERY AND METHOD FOR USING THEM

(75) Inventor: Rudolf Singer, Engelstadt (DE)

(73) Assignee: Umicore AG & Co. KG, Hanau-Wolfgang (DE)

(*) Notice: Subject to any disclaimer, the term of this patent is extended or adjusted under 35 U.S.C. 154(b) by 489 days.

(21) Appl. No.: 10/079,031

(22) Filed: Feb. 19, 2002

(65) Prior Publication Data
US 2002/0116952 A1 Aug. 29, 2002

(30) Foreign Application Priority Data
Feb. 23, 2001 (DE) .................. 101 08 831

(51) Int. Cl.
C03B 5/26 (2006.01)
C03B 7/098 (2006.01)

(52) U.S. Cl. .................. 65/327; 65/126; 65/128; 65/347; 65/374.12; 65/DIG. 4; 373/35

(58) Field of Classification Search .................. 65/122, 65/123, 125–129, 324–327, 135.6, 334, 347, 65/355, 356, 374.1, 374.11, 374.12, 492, 65/493, 495, 499, DIG. 4; 373/28–41; 222/592, 222/593
See application file for complete search history.

(56) References Cited

U.S. PATENT DOCUMENTS

| 1,622,666 | A | * | 3/1927 | Peiler | 65/327 |
| 1,680,543 | A | * | 8/1928 | Howard | 65/128 |
| 3,160,492 | A | * | 12/1964 | Chapman et al. | 65/128 |
| 3,460,932 | A | | 8/1969 | Keefer | |
| 3,508,904 | A | * | 4/1970 | Keefer | 65/326 |
| 3,554,727 | A | * | 1/1971 | Stevenson | 65/327 |
| 3,817,736 | A | * | 6/1974 | Kojo et al. | 65/129 |
| 4,162,152 | A | * | 7/1979 | Petro | 65/164 |
| 4,565,559 | A | * | 1/1986 | Perkins | 65/475 |
| 4,950,321 | A | * | 8/1990 | DiFrank | 65/325 |

FOREIGN PATENT DOCUMENTS

| DE | 33 16795 | 5/1983 |
| JP | 01072927 | 5/1989 |
| JP | 01298031 | 12/1989 |
| JP | 08217463 | 8/1996 |

OTHER PUBLICATIONS
PCT International Search Report, Jul. 31, 2002.

* cited by examiner

Primary Examiner—Eric Hug
(74) Attorney, Agent, or Firm—Kalow & Springut LLP

(57) ABSTRACT

The present invention provides devices for glass melt devlivery and methods for using these devices. In these devices, a delivery nozzle comprising at least one platinum group metal material is directly heated by electricty. To facilitate heating, a cylindrical heating ring is mounted in ceramic base. The device's construction ensures a regulatable heating of the nozzle and the melted glass flux.

17 Claims, 2 Drawing Sheets

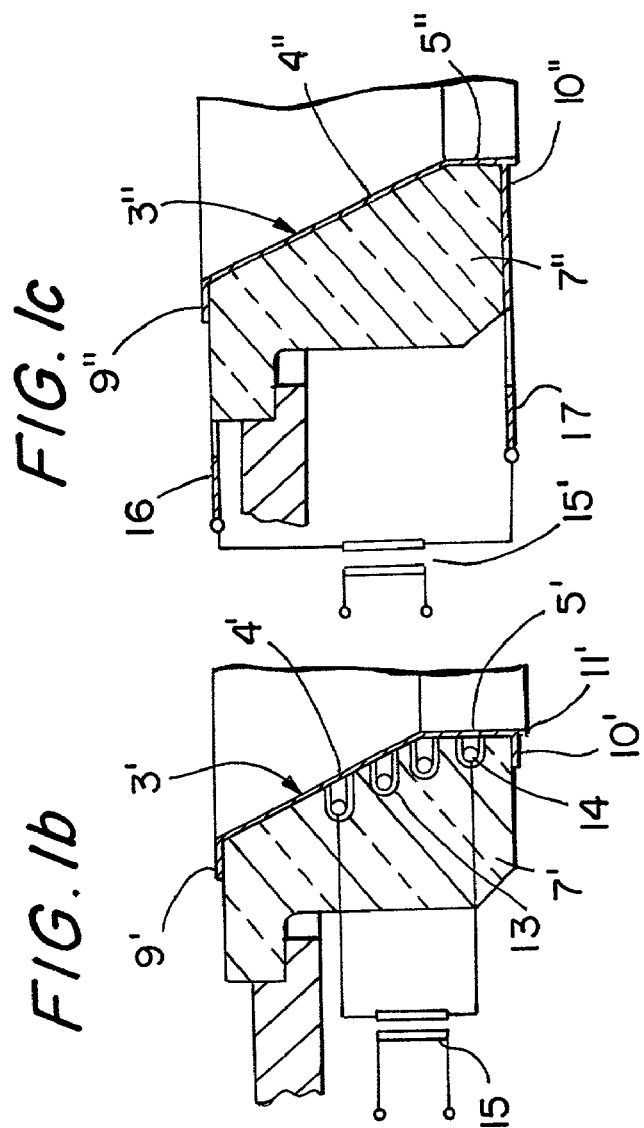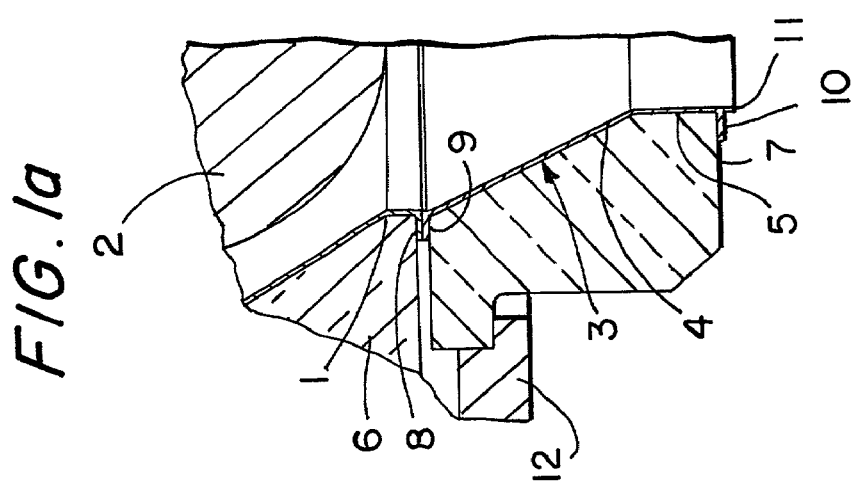

DEVICE FOR GLASS MELT DELIVERY AND METHOD FOR USING THEM

FIELD OF THE INVENTION

The present invention relates to glass melt delivery devices.

BACKGROUND OF THE INVENTION

Precious metals, and especially the platinum group metals ("PGM"), have been and continue to be used in the glass industry in processes for melting and heat-shaping special glass.

It is well known that PGM materials have high melting points, high heat stability, high mechanical strength, and resistance to abrasion. Because of these properties, PGM materials are particularly suitable for the production of construction parts that come into contact with high temperature liquids, such as glass melt. PGM materials suitable for parts that come in contact with glass melt include platinum, and alloys of platinum and/or other PGM metals, and may include minor amounts of base metals as alloys or additives. PGM materials typically used in the glass industry include fine platinum, PtRh10 (platinum-rhodium alloy with 10% rhodium,) or platinum that contains a small amount of finely divided refractory metal oxide, for example, zirconium dioxide. The use of zirconium dioxide with platinum increases the strength and high-temperature creep resistance of the platinum, and is called fine grain stabilized platinum ("FGS").

Components and devices for molten glass products are typically used for melting, refining, transporting, homogenizing and portioning of molten glass, and are well known to persons skilled in the art.

These components for delivery of glass melt are usually constructions of PGM material. Alternatively, they may be made of other high heat stability materials such as for example, fireproof ceramics, or base metal materials with a thin-walled protective PGM covering. The covering may be in the form of thin sheet metal or a surface coating applied by methods known in the art, including but not limited to plasma spraying and flame spraying.

The components that carry glass melt are often precious metal sheets constructed as thin-walled pipe systems. The molten glass flows through the pipe systems with temperatures of between about 1000° C. and about 1700° C. The pipe systems are typically surrounded externally by an insulating and supporting ceramic held by supporting metal constructions, for example metal boxes.

A feeder device is typically used to feed in, or to meter and to portion the glass melt into the appropriate moulds of processing machines, for example, pressing machines, blowing machines, and press-blowing machines. The feeder is made up of a feeder head, feeder needle and feeder nozzle, also called a delivery nozzle. The use of feeders for glass melt delivery is well known to persons skilled in the art.

The temperature control in these components plays an essential role due to the high temperatures of operation, which is typically in the range of about 1000° C. to about 1700° C. To enable controlled supply or removal of heat, the components are heated electrically in some cases. This can be done either indirectly by additionally installed heating conductors, or directly by resistance heating of the PGM components of the nozzle. In the case of direct heating, the precious metal sheet acts as the heating conductor. The electrical energy introduced to the PGM sheet is converted into heat due to specific electrical resistance of PGM.

To be able to draw electrical energy into the component at the various places through the insulation, heating flanges or heating vanes are used. These establish the connection from the current source, for example the power cable or conductor rail of a transformer, to the precious metal component. The shaping and dimensions of the noble metal component and the shaping, dimensions and positioning of the current feeds are critical for carrying electrical current and for local evolution of heat during direct heating.

For portioned generation of glass drops or glass strands by the glass melt feeder, certain processing parameters must be adhered to precisely. In most cases, an accuracy of about ±1° C. processing temperature is necessary. It is essential for the weight of the glass drops or glass strands to be highly constant, in practice within a variation of about ±1%. In some cases, for example in the case of relatively small drops of less than 100 grams, the permitted deviation in weight is significantly less than one gram. Further, it may also be important to adhere to a defined drop shape, depending on the glass end product to be produced. In these cases, the length-width ratio of the drop requires particular attention.

The construction and temperature control of the delivery nozzle are critical to controlling glass temperature, drop weight and drop shape during the delivery of glass melt.

FIG. 1 shows in three detailed diagrams (a), (b) and (c) the construction of a feeder as typically known in the art, shown in axial half-section.

Detailed diagram (a) illustrates the fundamental construction of a typical feeder. The feeder comprises the conically shaped feeder head (1), in which the dome-shaped tip of the feeder needle (2) ends. The feeder nozzle, also called the delivery nozzle (3), comprises a conical funnel-shaped section (4) and a cylindrical end piece (5). The feeder nozzle sits flush on the feeder head (1). The feeder head and feeder nozzle are made of a thin PGM sheet and are surrounded on the outside by complementary and interlocking ceramic components (6), (7), against which they are held with PGM flanged rings (8), (9), (10) at the ends. The feeder nozzle has a take-off bar (11) that can protrude to a greater or lesser degree over the lower flanged ring (10). The delivery block (7) is mounted in a ring holder (12) of steel.

Such an unheated construction of the feeder device has the limitation that heat is withdrawn from the glass flux to an intolerable degree, especially in the critical region of portioning and shaping.

Detailed diagrams (b) and (c) show heated nozzle constructions according to the prior art.

Detailed diagram (b) shows an indirectly heated feeder nozzle in axial half-section (3'), which is fixed to the delivery block (7') via flanged rings (9'), (10') at the ends. The delivery block (7') has spiral or twisting grooves on the inside (13), into which a heating coil (14) of noble metal, for example, platinum or platinum alloy wire is inserted. The connection to the electrical current supply (transformer) (15) passes through bores in the ceramic component (7').

In this construction, the conical (4') and in part the cylindrical (5') section of the delivery nozzle (3') and the delivery block (7') are heated. However, the glass suffers the greatest heat loss on the under-side of the delivery nozzle due to radiation of heat and removal via the free surface of the flanged ring (10') and take-off bar (11'). As a result, the lower part of the delivery nozzle cools to a greater degree at the take-off bar (11'), and therefore the glass cools at this particularly critical place.

Detailed diagram (c) shows a directly heated feeder nozzle in axial half-section, (3"), that is fixed to the interlocked delivery block (7") via flanged rings (9"), (10") at the ends. Current feeds (vanes) (16), (17) connected to the electrical current source (transformer) (15') are shaped on to the flanged rings (9"), (10"). In this construction, the entire funnel of noble metal (3") with the conical (4") and cylindrical (5") section is electrically directly heated.

This construction also has the limitation that more heat is withdrawn than can be supplied in the conical region, especially in the lower region, via the large free surface of the flanged rings.

The present invention is an improvement over these known constructions. According to present invention, a device comprised of an electrically directly heated delivery nozzle for glass melt that utilizes PGM material is provided. This device is constructed so that it does not have the disadvantage of excess heat withdrawal from the system. Additionally the device of the present invention provides regulatable, effective heating of the delivery nozzle and therefore of the glass flux, particularly in the critical region of portioning and shaping.

SUMMARY OF THE INVENTION

The present invention provides a device for heating glass melt and methods for using this device. This invention provides a device that comprises a delivery nozzle for glass melt that is heated directly and through an electric current source. The nozzle contains at least one PGM material, mounted in a ceramic component in an interlocked manner and attached to the ceramic component with axial flanged rings at the ends.

According to one embodiment of the present invention, the delivery nozzle is comprised of a conical funnel-shaped part and a cylindrical end piece. The cylindrical end piece of the described nozzle has a take-off bar that is connected through a flanged ring to a cylindrical heating ring of PGM material. The cylindrical heating ring is arranged in a ceramic component coaxially at a distance around the cylindrical end piece, and it is attached to a lower flanged ring adjacent to the take-off bar.

Current feed metal sheets of PGM, which may be referred to as "PGM metal sheets" are also attached to the cylindrical heating ring. Preferably, the PGM metal sheets are arranged radially on opposite sides, positioned axially with the surface, and passed through slits in the ceramic component.

Under another embodiment, the present invention provides a device comprising:
 a. a ceramic component;
 b. a cylindrical heating ring, wherein said cylindrical heating ring is located within the ceramic component; and
 c. a delivery nozzle, wherein said delivery nozzle is comprised of at least one platinum group metal.

Under a preferred sub-embodiment, the present invention provides a device comprising:
 a. a ceramic component, wherein in said ceramic component are slits;
 b. a nozzle, wherein said nozzle comprises a conical funnel shaped part, and a cylindrical end piece, and said funnel shaped part is located adjacent to said cylindrical end piece;
 c. an upper axial flanged ring;
 d. a lower axial flanged ring;
 e. a take-off-bar located distal to the end of the cylindrical end piece that is adjacent to the conical funnel shaped part and adjacent to said lower axial flanged ring;
 f. a cylindrical heating ring located within said ceramic component, in contact with said lower axial flanged ring, and coaxial to said cylindrical end piece; and
 g. at least two current feeds sheets, wherein said current feed sheets are attached to said cylindrical heating ring and arranged radially on opposite sides and axial to the lower flanged ring and pass through said slits.

The construction according to the present invention provides a regulatable, effective heating of the delivery nozzle and therefore of glass flux, particularly in the critical region of portioning and shaping.

BRIEF DESCRIPTION OF THE FIGURES

FIG. 1. FIG. 1 is a representation of the construction of a feeder as known in the art, in axial half-section, in three detailed outline diagrams (a), (b) and (c).

FIG. 2 provides two detailed outline diagrams (a) and (b) showing the construction of a device according to the present invention in axial half-section (detailed diagram (a)) and in the cross-section of plane A—A (detailed diagram (b)).

DETAILED DESCRIPTION OF THE INVENTION

Figure 2A:
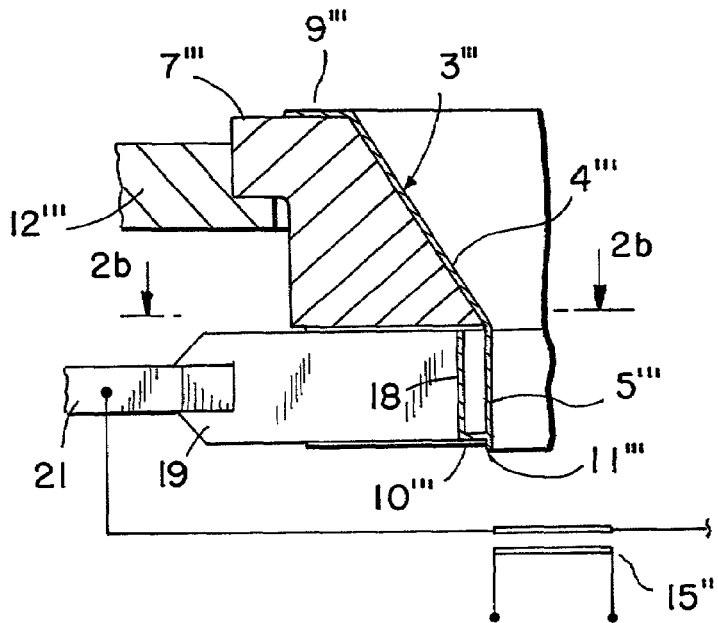
FIG. 2.

The present invention provides a device for heating glass melt. According to the present invention, a cylindrical heating ring is arranged within an insulating ceramic component. This cylindrical heating ring is heated electrically by resistance heating. This heating acts indirectly on an inner cylindrical section of a delivery nozzle, and thus on the glass flux. Additionally, as the current flows over the heating ring, it flows over a lower flanged ring adjacent to a take-off bar, and also in part over the inner section of the delivery nozzle. The described construction and appropriately chosen coordinated material thickness ensure more intense heating of the cylindrical part of the delivery nozzle and the take-off bar. Preferably, current feed metal sheets (vanes) at least partly enclosed in the ceramic, also act as heating conductors. Consequently, the ceramic component is also heated, preventing cold places at the transition from the vane to the heating ring, and also preventing heat withdrawal from the ceramic component and from the device.

The preferred embodiments of the present invention will now be described. These embodiments are presented to aid in an understanding of the present invention and are not intended, and should not be construed, to limit the invention in any way. All alternatives, modifications and equivalents that may become obvious to those of ordinary skill in the art upon reading the disclosure are included within the spirit and scope of the present invention. Further, this disclosure is not intended to be a treatise on delivery nozzles. Readers are referred to appropriate available texts on this subject for additional information as necessary.

According to the present invention, a device for delivering glass melt is provided. The device comprises a ceramic component and a delivery nozzle.

The ceramic component is comprised of a ceramic material. Ceramic materials are well known to persons skilled in the art. Located within the ceramic component is a cylindrical heating ring that preferably is comprised of at least one PGM material.

The delivery nozzle is also preferably comprised of at least one PGM material and permits the delivery of glass melt. It preferably contains a conical funnel and cylindrical end piece, wherein one end of the conical funnel is proximal to one end of the cylindrical end piece. The delivery nozzle is mounted in an interlocked manner in the ceramic component and fixed to the ceramic component by axial flanged rings.

Further, there are preferably at least two axial flanged rings. When there are two axial flanged rings, these rings are preferably located at each end of the delivery nozzle. When they are located at each end of the delivery nozzle, the flanged ring that is located at the funnel end of the nozzle that is distal to the cylindrical end piece may be referred to as the "upper flanged ring," and the other flanged ring, which is located at the end of the cylindrical end piece distal to the funnel may be referred to as the "lower flanged ring."

Preferably, the delivery nozzle of the present invention also comprises a take-off bar located at the lower end of the cylindrical end piece and adjacent to the lower flanged ring.

The aforementioned cylindrical heating ring that is located within the ceramic component is located coaxially around the cylindrical end piece. The cylindrical heating ring, which has a lower edge and an upper edge, is also preferably joined to the lower flanged ring at the lower edge. The lower edge refers to the edge of the cylindrical end piece that is distal to the funnel portion of the delivery nozzle; the upper edge refers to the edge of the cylindrical end piece that is proximal to the funnel portion of the delivery nozzle.

The cylindrical heating ring is preferably heated by an electric current source. In one sub-embodiment, feed metal sheets are passed through slits in the ceramic component to the cylindrical heating ring and when supplied with electricity heat the cylindrical heating ring. Further, there are preferably at least two feed metals sheets and the components of a pair of feed metal sheets are located on opposite sides of each other and positioned axially. The feed metal sheets are preferably comprised of at least one PGM material.

According to the present invention, the distance between the cylindrical heating ring and the cylindrical end piece is preferably about one to three times the wall thickness of the cylindrical end piece.

Under one embodiment of the present invention, the height of the cylindrical heating ring extends approximately over the total height of the cylindrical end piece, in order to achieve controlled heating. The lower edge of the heating ring can be adjoined flush to the flanged ring adjacent to the take-off bar, can likewise be closed off flush with the take-off bar, or can protrude over the plane thereof to a greater or lesser degree.

In another embodiment, the heating ring can extend beyond the plane formed by the take-off bar, in order to heat this space by radiation.

In a preferred embodiment, radially arranged current feed metal sheets of PGM material are positioned axially with respect to the cylindrical heating ring, are arranged on opposite sides of the cylindrical heating ring, and have about the same height as the heating ring. Two current feed metal sheets may be attached at an angle of about 180° to one another. This ensures a uniform local flow of current in the component. However, several pairs of current feed metal sheets can also be attached, preferably with each set of two being at an angle of about 180° to one another, and distributed an equal distance from one another on the circumference. This results in a particularly uniform local flow of current in the component.

The device of the present invention is preferably comprised of fine platinum, platinum-rhodium alloy with 10% rhodium, or fine grain stabilized platinum, or mixtures thereof.

The device of the present invention may be used to heat glass melt. Under one embodiment, electricity is send through the metal feed sheets to heat the cylindrical heating unit. As the current is carried, the lower flanged ring also carries the electricity, and the PGM material of the delivery nozzle, which lines the lumen of the nozzle is also heated. This method of heating allows for efficient heating of glass metal, which may be applied to moulds or for other uses that are now known or that come to be know to persons skilled in the art.

Figure 2B:
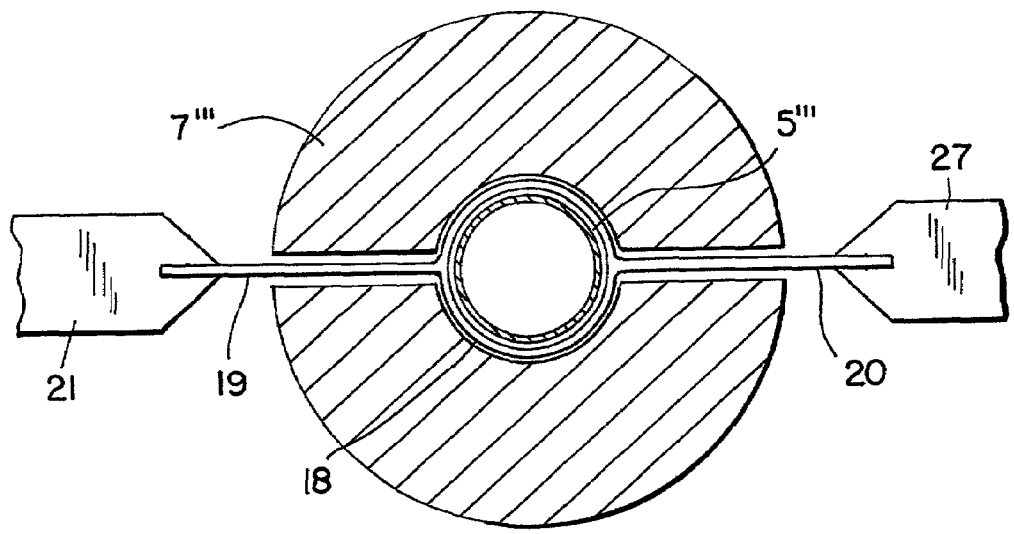

FIG. 2 shows by way of example in two detailed outline diagrams (a) and (b) the construction of a device according to the invention, in axial half-section (detailed diagram (a)) and in the cross-section of plane A—A (detailed diagram (b)).

The directly heated feeder nozzle (delivery nozzle) (3''') of the invention is comprised of a conical funnel-shaped section (4''') and a cylindrical end piece (5'''). The feeder nozzle is made of thin PGM sheets and is surrounded on the outside by the complementary and interlocking supporting ceramic component (7'''), against which it is held by PGM flanged rings (9'''), (10''') at the ends. The feeder nozzle has a take-off bar (11''') that protrudes over the lower flanged ring (10'''). The delivery block (7''') is mounted in a ring holder (12''') of steel. A cylindrical heating ring (18) of approximately the same height of PGM material is arranged coaxially around the cylindrical end piece (5'''). At a distance of about two wall thickness, the lower edge of the heating ring is attached by welding, and is flush with the lower flanged ring (10''') adjacent to the take-off bar (11'''). Two radially arranged current feed metal sheets (19), (20) of PGM material positioned axially with the surface are attached by welding to the heating ring (18) on opposite sides, at an angle of about 180°. These are passed through slits in the ceramic component (7''') and connected to the current source (transformer) (15'') on the outside via current feed tracks (21).

What is claimed is:

1. A glass melt delivery device comprising:
   a. a ceramic component;
   b. a cylindrical heating ring, wherein said cylindrical heating ring is located within the ceramic component; and
   c. a delivery nozzle, wherein said delivery nozzle comprises at least one platinum group metal and comprises a cylindrical end piece and a conical funnel, wherein said heating ring and said cylindrical end piece are located a distance apart that is from about one to about three times the wall thickness of the cylindrical end piece.

2. The device according to claim 1, wherein said cylindrical heating ring comprises a platinum group metal.

3. The device according to claim 2, further comprising feed metal sheets, wherein said feed metal sheets are connected to said cylindrical heating ring.

4. The device according to claim 3, further comprising a take-off bar.

5. The device according to claim 4, further comprising a lower flanged ring wherein said lower flanged ring is adjacent to said take-off bar.

6. The device according to claim 1, wherein said heating ring extends over the cylindrical end piece.

7. The device according to claim 5, wherein said heating ring has a lower edge and said lower edge is adjoined flush to said lower flanged ring.

8. The device according to claim 3, further comprising current feed metal sheets, located axially with the surface of said cylindrical heating ring and arranged on opposite sides of said heating ring.

9. The device according to claim 8, wherein said current feed metal sheets comprise a platinum group metal.

10. The device according to claim 8 wherein said current feed metal sheets are approximately the same height as said heating ring.

11. The device according to claim 1, wherein said heating ring comprises fine platinum or a platinum rhodium alloy with 10% rhodium or a fine grain stabilized platinum or mixtures thereof.

12. The device according to claim 8, wherein two feed metal sheets are arranged at an angle of 180° to each other.

13. A device for delivering glass melt comprising:
 a. a ceramic component, wherein in said ceramic component are slits;
 b. a nozzle, wherein said nozzle comprises a conical funnel shaped part, a cylindrical end piece, and said funnel shaped part is located adjacent to said cylindrical end piece;
 c. an upper axial ring;
 d. a lower axial flanged ring;
 e. a take-off-bar located distal to the end of the cylindrical end piece that is adjacent to the conical funnel shaped part and adjacent to said lower axial flanged ring;
 f. a cylindrical heating ring located within said ceramic component, in contact with said lower axial flanged ring, and coaxial to said cylindrical end piece. wherein said heating ring and said cylindrical end piece are located a distance apart that is from about one to about three times the wall thickness of the cylindrical end piece; and
 g. at least two current feeds sheets, wherein said current feed sheets are attached to said coaxial cylindrical heating ring and arranged radially on opposite sides and axial to the lower flanged ring and pass through said slits.

14. A method for heating of glass melt comprising using the device of claim 1.

15. A method for heating of glass melt comprising using the device of claim 13.

16. A method for heating of glass melt comprising using the device of claim 1 and heating the nozzle directly with electrical current.

17. A method for heating of glass melt comprising using the device of claim 13 and heating the nozzle directly with electrical current.

* * * * *